United States Patent Office 2,924,260
Patented Feb. 9, 1960

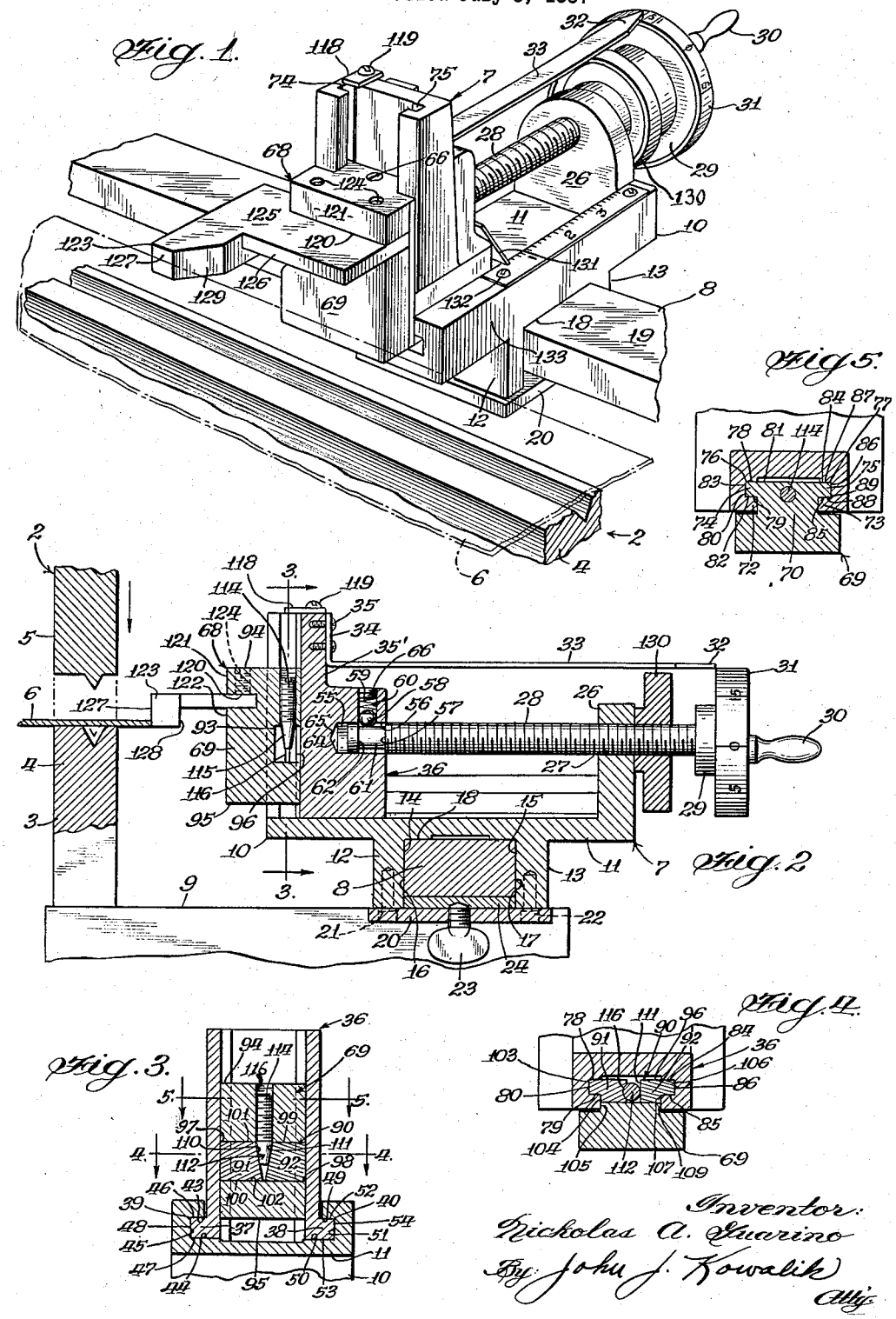

2,924,260

GAUGE FOR SHEET METAL WORKING PRESSES

Nicholas A. Guarino, Elmwood Park, Ill.

Application July 5, 1957, Serial No. 670,258

7 Claims. (Cl. 153—21)

This invention relates to gauges for sheet metal working presses and more specifically to a novel gauge for use in a press brake for gauging bends in sheet metal.

Various gauge mechanisms have heretofore been proposed but have failed to gain wide acceptance because they had only limited use or were costly or extremely complex and difficult to adjust In press brake gauges accuracy and ruggedness are extremely important features and previous attempts have failed to provide both of these attributes in a simple unit at low cost.

A general object of the invention is to provide a rugged, simple and highly accurate gauge which may be easily adjusted and mount various gauge tools.

A further object is to provide a press brake gauging mechanism of such nature that one or more of such mechanisms may be adjustably attached to the press brake anvil or bed structure by a channel or rail or the like so that the gauging unit or units may be shifted to any locus along the anvil or bed die for gauging contact with the work, each unit further being adjustable transversely as well as vertically with respect to the press bed die to position the tool for internal, external as well as edge contact with the work.

A more specific object is to device a novel gauge unit which includes a tool carrying element which is suitably connected to various calibrated incremental adjusting means for positioning the tool in desired locus.

These and other objects of the invention will become more apparent from the specification and drawings, wherein:

Figure 1 is a perspective view of the gauge mechanism in association with a press fragmentarily shown and the work-piece illustrated in phatom lines;

Figure 2 is a longitudinal sectional view of the press and gauge mechanism;

Figure 3 is a transverse vertical sectional view taken substantially on line 3—3 of Figure 2;

Figure 4 is a horizontal sectional view on the line 4—4 of Figure 3; and,

Figure 5 is a horizontal section on line 5—5 of Figure 3.

Describing the invention in detail the press brake generally designated 2 is of any conventional construction as well known to those skilled in the art and comprises a bed or anvil portion 3 to which is attached the anvil or stationary female die 4 and against which operates the reciprocating male die 5 for bending the work-piece 6 which may be in the form of a piece of sheet metal entered between the dies.

The bend in the sheet metal is determined by the gauge mechanism generally characterized 7 mounted on the support or mounting bar 8 which runs the length of the anvil die 4 generally parallel and in laterally inwardly spaced relation thereto. The bar 8 is mounted upon the side frames 9 of the bed of the press. It will be understood that there are several of these gauging mechanisms on the support 8 and each mechanism comprises a frame 10 elongated transversely of the bottom die 4. The frame includes a generally rectangular base 11 intermediately of which there are provided integral depending front and rear flanges 12 and 13 which abut on their confronting sides 14 and 15 against the front and rear edges 16 and 17 of the bar. The base provides between the flanges 12 and 13 a bottom seat 18 via which the mechanism 7 rests on the top surface 19 of the support bar. The flanges 12 and 13 are straddled across their bottom extremities by a retaining plate 20 which underlies the bar 8 and at opposite edges is secured by bolts 21 and 22 to the flanges 12 and 13, respectively. The gauge is held in adjusted position along the length of the bar by locking wing bolts 23 which are threaded through the plate 20 and tighten against the support bar through a plate 24 which prevents gouging the support bar.

The body portion 10 of the gauge is provided with an upstanding end wall 26 through which there is threaded at 27 a horizontal traverse screw 28 to the rear end of which there is secured a calibrated gauge wheel 29 to which is connected a crank 30. The periphery 31 of the wheel is graduated and marked with indicia 0—5—10—15 etc. which register with a pointed end 32 of a pointer 33.

The pointer extends lengthwise of the device and at its other end 34 is secured as by screws 35 to the back side 35' of a horizontal traverse block or horizontal gauge element 36.

The block 36 has a pair of outwardly extending lugs 37 and 38 at opposite sides which fit into complementary slots 39 and 40 at opposite sides of the body portion 10 of the gauge above the base 11 thereof. Slots 39 and 40 have inwardly open sides and the upper, lower and outer sides or surfaces 43, 44, 45 of slot 39 are accurately formed and guide the lug 37 which has sides 46, 47, 48 engaging the sides 43, 44, 45. Similarly the top and bottom sides 49 and 50 and outer vertical side 51 of slot 40 form accurate guides for lug 38 and engage its corresponding sides 52, 53, 54 to guide the block horizontally.

The block 36 is moved by the screw 28 which has its forward end 55 entered into a horizontal aperture or bore 56 formed generally centrally in the back side of the block. The end 55 of the screw has a cylindrical reduced portion 57 into which a ball 58 is pressed by a spring 59 which with the ball fits in a vertical opening 60, the spring bearing at its lower end on the ball and pressing it against the cylindrical periphery 61 of the end portion 55 of the screw behind the radial shoulder 62 to prevent withdrawal of the screw. The tapered forward terminal end 64 of the screw complementally bears against the closed end 65 of the bore 56 to move the block forwardly and retraction of the block loads the shoulder against the ball. The spring is held compressed by the plug 66 which is threaded into the upper end of bore 60 and bears against the upper end of the spring 59.

A tool holder 68 is mounted on the forward side of the horizontal traverse block 36 and has a dovetail interlock therewith and is vertically adjustable with respect thereto and comprises a block 69 having an intermediate portion 70 of reduced width which fits between the introverted laterally spaced vertical flanges 72, 73 on the forward side of the block 36. The inner portion of block 69 is provided with vertical guide lugs 74, 75 at opposite sides which fit behind flanges 72, 73 respectively and enter into vertical slots 76, 77 which open inwardly, slot 76 being defined by vertical inner and outer accurately formed surfaces 78, 79 and a lateral surface 80. These faces 78, 79, and 80 are engaged by the accurately formed inner and outer and lateral faces or sides 81, 82, and 83 on guide 74. Similarly, slot 77 is defined by inner, outer and lateral guide surfaces 84, 85 and 86 engaging the opposing inner, outer and lateral guide faces 87, 88, 89 on the lug 75.

The tool holder is locked or secured in the desired vertically adjusted positions by a novel locking mechanism generally designated 90 including a pair of laterally spaced wedge shoes 91 and 92 which are disposed at opposite sides of a pocket 93 formed in the block 69 between its upper and lower extremities 94 and 95 and as best seen in Figures 2 through 4, the pocket 93 has an open back side 96, and lateral open ends 97 and 98 through which project the wedge shoes 91 and 92 which at their top and bottom horizontal edges 99 and 100 are in guided engagement with the horizontal top and bottom surfaces 101 and 102 of the pocket to guide the shoes in and out of the pocket. The remote or outer edges of the shoes 91 and 92 provide horizontally stepped vertical friction or locking faces, these surfaces 103 and 104 on shoe 91 engaging surfaces 80 and 105 on the block 36 and the corresponding surfaces 106 and 107 on the shoe 92 engaging surfaces 86 and 109 on the block 36. The shoes are preferably formed of brass or like material which has good seizure characteristics for holding the tool holder block 69 against vertical movement. It will be noted from Figure 4 that the outer portions of the shoes are narrower than the inner portions to provide an interlock by the shoes in the slots 76 and 77 and that the inner portions are relatively broad to provide large bearing areas at their upper and lower edges as well as on their inner or confronting edges or wedge faces 110 and 111 (Figure 3) which converge downwardly and are engaged by the wedge means 112 which urges the shoes apart attendant to downward movement thereof. In the present instance these wedge means comprise a downwardly tapered nose or end 112 on the lower end of a screw 114, said nose providing a downwardly focused conical surface 115 (Figure 2) which rotatably engages the surfaces 110 and 111. Preferably one of the shoes such as 91 may have a complementary curvature or conical segmentary at 116 (Figure 4) to interlock the shoe with the wedge against horizontal movement into and out of the open back side 96 of the pocket whereas the other shoe 92 may have the face 111 flat and tangentially engage the conical wedge 115. Shoe 92 thus adjusts its position horizontally in two planes and thus corrects only slight misalignments which may occur upon wear of the unit.

As previously indicated the wedge is part of a screw, the shank 114 of which is threaded into a vertical bore 116 in block 69 and open through the upper extremity 94 thereof. The screw 114 has an upper wrench-engaging end for rotation by an appropriate tool. A stop 118 is pivotally mounted by a screw 119 on the upper end of block 36 in the path of movement of block 69 to limit its upper movement out of assembly with block 36 as it is carried about but is swingable out of the path of such movement when it is desired to adjust the position of the block at a higher elevation and for such reason the disposition of the locking means intermediate the top and bottom of holder 69 as shown allows such positioning of the holder.

The holder 69 has a forwardly open preferably horizontal jaw 120 adjacent to its upper end and comprises top and bottom jaw members 121 and 122 between which is received the gauge tool 123 and clamped therein by screws 124 threaded in the upper jaw element 121.

As best seen in Figures 1 and 2 the tool-carrying or vertical gauge block 123 preferably has a plate-like mounting portion 125 which fits into the jaw and may provide a forward guide or indexing edge 126. It may be also formed with a forwardly projecting guide portion which provides an external guide edge 127, the projection depending below the plate 125 and providing an internal guide or indexing surface 128 with the tool inverted as well as a diagonal guiding surface 129. In order to operate the unit after it has been sleeved over the support bar and tightened in place and the tool entered in the jaw, the crank 30 is actuated to rotate the horizontal traverse screw 28 after the locking ring 130, which is threaded on the screw 28 between the support flange 26 and the combined gauge wheel and crank assembly 29, is backed off. The horizontal traverse of the block 36 and tool chuck 68 mounted thereon is gauged initially by the pointer 131 mounted on the back side of block 36 and the ruler or linear scale 132 with which it registers, the ruler 132 extending lengthwise of the base and mounted and secured upon the top side of guide rail 133 (Figure 1). Then the fine or incremental adjustments are made by reading the calibration on the wheel or vernier scale 29 against the pointer 33. Vertical adjustment is normally determined by eye and this proceeds by loosening screw 114, then positioning the block 69 manually and then tightening the screw 114.

Thus a novel and practically foolproof unit is provided with easy calibrated horizontal adjustment. A novel vertical adjustment is obtained without any cumbersome interfering adjusting structure and one which positively holds the tool chuck in place. After having made the horizontal adjustment the locking wheel is rotated to engage with the end wall.

It will be understood that a preferred form of the invention has been shown and described and the invention is not to be limited to the particular structure shown but as set forth in the appended claims.

I claim:
1. A gauge comprising a mounting frame including a base member having a horizontal slot, a horizontal gauge block slidably supported on said base member within said slot for movement to and fro, said base member having a proximal extremity and a distal extremity, an upstanding end wall on said distal extremity, an adjusting screw threaded through an opening in said wall and having one end rotatably connected to said horizontal gauge block, a gauge cylinder directly connected to the opposite end of said screw outwardly of said wall, a locking nut threaded on the screw between said cylinder and wall for locking engagement with the latter, a pointer connected to said horizontal gauge block and movable therewith and extending to said gauge cylinder, said gauge cylinder movable with the block and in constant relative relationship to the pointer, graduations on the cylinder cooperatively readable against said pointer, and a tool chuck mounted upon said horizontal gauge block.

2. In a gauge for press brakes, a frame adapted to be attached to the press, a horizontal gauge block mounted thereon, means for adjusting the horizontal position of said block on the frame, a vertical gauge block slidably interlocked with the horizontal gauge block, and quick-locking means for releasably locking said vertical block in selected vertically displaced positions and comprising a pair of vertical surfaces on said horizontal block embracing said vertical block therebetween, said vertical block having a pocket with a face extending transversely of said vertical surfaces, a locking shoe in vertically slidable engagement with each vertical surface and in slidable engagement with said face, said shoes having confronting converging wedge faces, and a wedge element threaded in said vertical block and wedged between said faces urging them apart and against respective surfaces.

3. The invention according to claim 2 and further characterized in that at least one of said faces is arcuate and in complementary engagement with said wedge element.

4. The invention according to claim 2 and one of said wedge faces being substantially flat and the other of said faces being arcuate, and said wedge member complementally engaging said arcuate face and tangentially engaging said flat face.

5. A brake press gauge comprising a base adapted to be mounted upon the press, a horizontal gauge element adjustably mounted upon said base, said element having a forward side with a pair of vertical lateral forwardly extending flanges and introverted flanges on said lateral flanges defining therewith vertical guide slots, a tool-carrying vertical gauge member having a portion extending between said introverted flanges and having side flanges projecting into respective slots in vertical guided engagement with the sides thereof, said member having a pocket intermediate its ends open to respective flanges of said element, said lateral and introverted flanges providing laterally stepped guide surfaces, a shoe at each side of the pocket having laterally stepped guide surfaces in engagement with respective laterally stepped surfaces, and wedge means releasably interposed between said shoes and urging said shoes apart.

6. In a brake press gauge having a base, a horizontal gauge element slidably mounted thereon, means for adjusting said element fore and aft and including means for gauging the position of said element comprising a horizontal screw rotatably connected at one end to the element, an upstanding member on said base having a threaded opening through which an intermediate portion of said screw extends, a cylinder connected to said screw, a peripheral vernier scale on said cylinder, a pointer connected to said element and extending parallel to said screw and having an end remote from said element disposed in indicating relation to said vernier scale, said pointer and said cylinder movable horizontally together, a linear scale mounted on said base and extending parallel to the screw, and a pointer extending laterally from said element in indicating relation to said linear scale.

7. The invention according to claim 2 and further characterized in that said shoes are made of material having a high seizure characteristic.

References Cited in the file of this patent

UNITED STATES PATENTS

| | | |
|---|---|---|
| 1,404,989 | Marcy | Jan. 31, 1922 |
| 1,500,264 | Peterson | July 8, 1924 |
| 1,920,035 | Stephens | July 25, 1933 |
| 2,324,803 | Snyder | July 20, 1943 |
| 2,426,446 | Funk | Aug. 26, 1947 |
| 2,454,989 | Carlson | Nov. 30, 1948 |
| 2,458,846 | Gilmore | Jan. 11, 1949 |
| 2,502,056 | Million | Mar. 28, 1950 |
| 2,510,768 | Williamson | June 6, 1950 |
| 2,679,272 | Giannone | May 25, 1954 |